(12) United States Patent
Wagner

(10) Patent No.: US 8,304,088 B2
(45) Date of Patent: Nov. 6, 2012

(54) BUILDING BOARD WITH COATING AND METHOD OF COATING BUILDING BOARDS

(75) Inventor: Uwe Wagner, Schloss Holte-Stukenbrock (DE)

(73) Assignee: düspohl Maschinenbau GmbH, Schloss Holte-Stukenbrock (DE)

( * ) Notice: Subject to any disclaimer, the term of this patent is extended or adjusted under 35 U.S.C. 154(b) by 0 days.

(21) Appl. No.: 13/020,181

(22) Filed: Feb. 3, 2011

(65) Prior Publication Data

US 2011/0229732 A1 Sep. 22, 2011

(30) Foreign Application Priority Data

Mar. 19, 2010 (DE) .......................... 10 2010 016 048

(51) Int. Cl.
*B32B 23/04* (2006.01)
(52) U.S. Cl. .................. 428/532; 428/537.5; 428/537.7; 427/391; 427/395
(58) Field of Classification Search .................. 428/532, 428/537.5, 537.7; 427/391, 395
See application file for complete search history.

(56) References Cited

U.S. PATENT DOCUMENTS

| | | | | |
|---|---|---|---|---|
| 4,163,813 A | * | 8/1979 | Sheets et al. .................. | 427/198 |
| 4,722,866 A | * | 2/1988 | Wilson et al. ............... | 428/411.1 |
| 4,969,302 A | * | 11/1990 | Coggan et al. ................ | 52/309.8 |
| 5,053,077 A | * | 10/1991 | Crompton .................. | 106/18.16 |

FOREIGN PATENT DOCUMENTS

| | | | |
|---|---|---|---|
| AT | 389495 B | | 12/1989 |
| DE | 3904819 A1 | | 8/1990 |
| DE | 19921189 | * | 11/2000 |
| DE | 19921189 A1 | | 11/2000 |
| DE | 202008006997 | * | 8/2009 |
| DE | 202008006997 U1 | | 8/2009 |
| EP | 2127832 | * | 12/2009 |
| EP | 2127832 A1 | | 12/2009 |

* cited by examiner

*Primary Examiner* — Leszek Kiliman
(74) *Attorney, Agent, or Firm* — Richard M. Goldberg

(57) ABSTRACT

A building board with coating includes at least one end face (7) covered by two superposed layers (10, 12) of a sheet material, and a layer (11) of filler material is applied between the sheet layers (10, 12).

8 Claims, 2 Drawing Sheets

BUILDING BOARD WITH COATING AND METHOD OF COATING BUILDING BOARDS

BACKGROUND OF THE INVENTION

The invention relates to a building board, especially a lightweight building board, having a coating, wherein at least one end face is covered by two superposed layers of sheet material. The invention further relates to a method of coating a building board.

The term building board designates boards, e.g. for the furniture industry, which have a core sandwiched between two cover plates. The core may be formed by a material, e.g. chipboard, that extends over the entire surface. As an alternative, the core may be composed by different materials and may for example comprise a frame of chipboard and a filling of a material that has a lower density. Among others, cardboard in honeycomb-configuration is used as filling. In view of their low weight, such boards are also termed lightweight building boards.

In order to obtain a good and uniform surface finish which may for example serve as a substrate for a high grade varnish, it is known to wrap building boards with a layer of a thin sheet material, e.g. paper or plastic film, in order to coat the same. In case of MDF boards (medium density fibre boards) which are frequently used as cover plates of building boards, the relatively smooth surface of this material assures that a sufficiently smooth finish of the main surfaces (top surface and bottom surface) of the building board is achieved by coating with a thin layer. However, when chipboard is used for the core or the frame of the core, the building boards have a relatively rough end face which cannot be sufficiently smoothened by a single-layer coating.

One possibility to avoid that the roughness of the end faces of the core imprints in the coating consists in filling the depressions in the end faces with hot-melt adhesives that have a high content of filling material, and grinding the end faces after the adhesive has cured and before the coating is applied. However, such adhesives are intricate to handle, which results in high costs for this method.

Another possibility has been disclosed in DE 199 21 189 A1. In the method disclosed in this document, a coating is formed by two layers of paper, a first paper layer covering one of the main surfaces of the building board and one end face, and a second paper layer covering the opposite main surface of the board and also the end face that has already been covered by the first paper layer. In this way, the end face is coated with two superposed layers of paper, whereby a greater amount of roughness can be smoothened out. However, when a particularly high grade surface finish is required, e.g. a mirror-gloss varnish, even this method does not provide sufficiently smooth end faces, at least when thin layers of paper are used. Thin paper layers are preferred to thicker paper layers because of their better processing characteristics and lower costs.

SUMMARY OF THE INVENTION

It is accordingly an object of the invention to provide a coated building board of the type indicated above, which can be produced easily and at low costs and which has a smooth and stable end face suitable for a high grade surface finish even when the coating is formed with thin sheet material. It is another object of the invention to provide a method of producing such a building board.

This object is achieved by a coated building board having at least one end face covered by two superposed layers of a sheet material, wherein a layer of filler material is provided between the two sheet layers. By means of the layer of filler material, any unevenness of a core which imprints through the first sheet layer at the end face of the building board may be smoothened out such that the second sheet layer will form a surface with the desired degree of smoothness. Compared to known methods wherein the depressions in the end face of the core are directly filled with a filler material, the method according to the invention has the advantage that the first sheet layer prevents the filler material from being absorbed into the porous structure of the core. The layer of filler material that is applied to the first sheet layer in accordance with the invention can be significantly thinner, so that the consumption of filler material is reduced. Moreover, this filler material can be applied in a single pass, whereas a method wherein the rough surface of the core is directly filled with the filler material requires either the use of a high-viscosity adhesive which is difficult to handle or, when a low-viscosity filler is used, a multi-pass coating procedure.

In a preferred embodiment the layer of filler material is formed by a varnish, and a varnish that cures under the influence of ultra-violet light (UV) is particularly preferred.

BRIEF DESCRIPTION OF THE DRAWINGS

Other useful details and further developments of the invention are indicated in the dependent claims. Two embodiment examples of the invention will now be explained in conjunction with the drawings, wherein:

DETAILED DESCRIPTION

Figure 1:
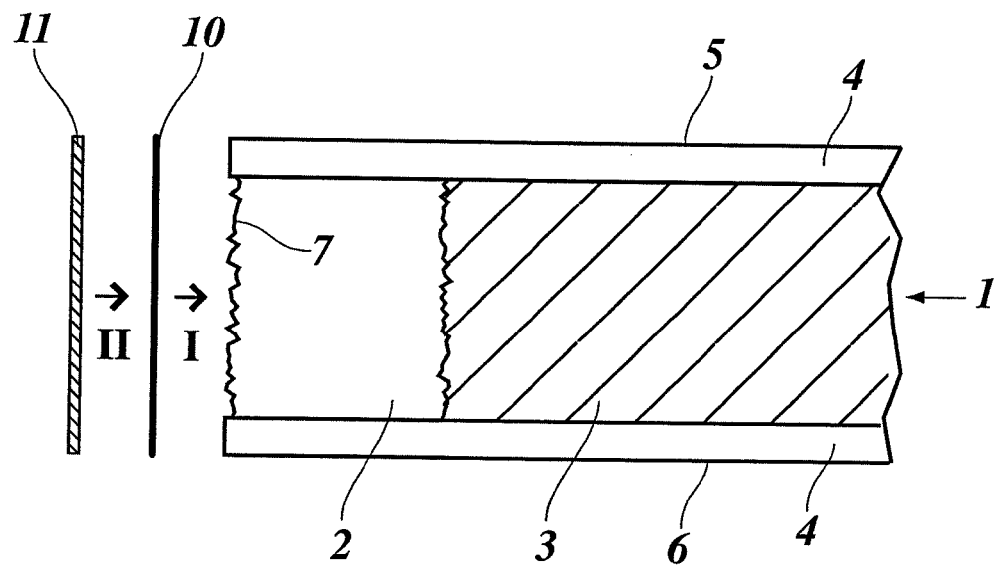
FIG. 1 is a schematic cross-sectional view of an edge region of a building board in an intermediate stage of a coating process.

FIG. 1 shows a cross-section in an edge region of a building board which has not yet been coated. The building board is a lightweight building board having a core 1 formed a frame 2 surrounding a honeycomb structure 3. A cover plate 4 is placed on each of the top and bottom surfaces of the core 1. Thus, the outer surfaces of the cover plates 4 form a top surface 5 and bottom surface 6 of the building board, the top surface 5 and the bottom surface 6 being jointly designated as main surfaces of the building board. The outer end face of the frame 2 and the cut edges of the cover plates 4, together, form an end face 7 of the building board. It shall be assumed here that the frame 2 is made of chipboard and the cover plates 4 are made of MDF. Thanks to the material of the cover plates 4, the top surface 5 and the bottom surface 6 of the non-coated building board have already a relatively smooth finish.

In contrast, the surface of the end face 7 is rough, especially in the central region of the core 1. The materials for the cover plates 4 and the frame 2 which have been mentioned here as an example shall not limit the invention. The invention may be applied to building boards that are made of other materials, in order to coat a rough end face thereof.

In a first step I, symbolized in the drawing by an arrow I, a first layer 10 of a sheet material is applied. The sheet material may be thin paper or a thin plastic film, for example. In the example shown in FIG. 1, the first sheet layer 10 is a strip of sheet material that has a width adapted to the thickness of the building board. Any known bonding process may be used for applying the first sheet layer 10. In particular, the first sheet layer 10 may be impregnated or coated with hot-melt adhesive and may be bonded to the end face by applying heat and pressure.

In a subsequent step II, a layer 11 of a filler material is applied onto the first sheet layer 10. To that end, a sticky and curable filler material in the form of a liquid with low to medium viscosity may be coated onto the first sheet layer 10. This can be done by knife, doctor, roller, spray or vacuum coating. Since the roughness of the end face 7 has already been mitigated to a large extent by the first sheet layer 10, the layer 11 of filler material may be relatively thin. Moreover, when a suitable material is used, the layer 11 of filler material may also serve for reinforcing the end face 7.

Preferably, the layer 11 may be a layer of varnish. It is particularly convenient to use the same varnish that will later be used for a surface finish of the building board as a whole. This, on the one hand, simplifies the process steps in the manufacture of the coated building board and, on the other hand, assures that the layer 11 will be compatible with the coating to be applied later, e.g. in terms of colour. In view of its good mechanical properties and rapid curability, a UV curing lacquer is particularly suited as filler layer 11. In addition, the UV cured lacquer is very hard, whereby the end face 7 is effectively reinforced and protected.

Once the layer 11 has been cured, it may be smoothened further by grinding, if necessary. The grinding process may be combined with an optional machining of one or both edges of the building board, e.g. bevelling or rounding-off.

Figure 2:
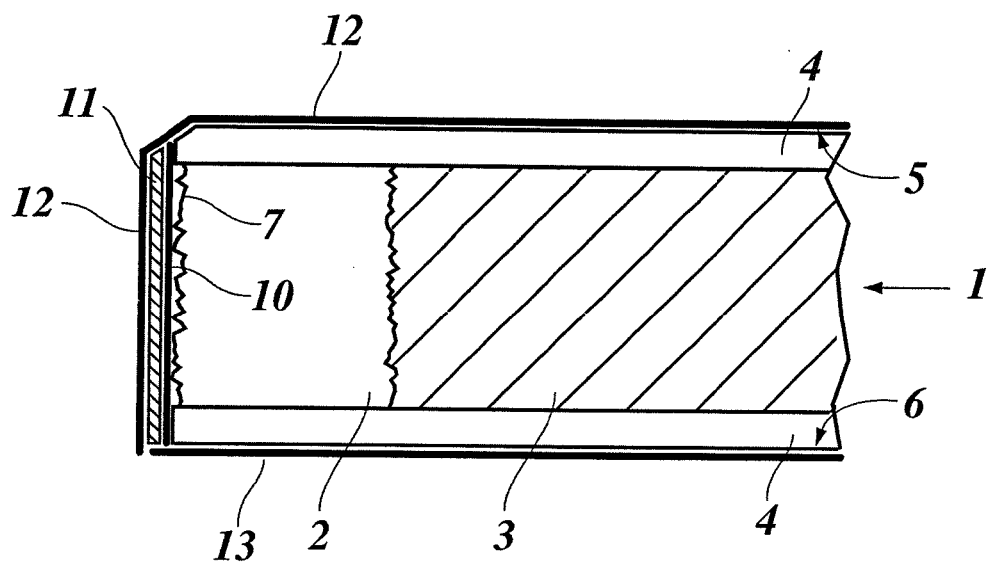
FIG. 2 is a first example of a coated building board.

FIG. 2 shows the same region of the building board as FIG. 1, but in a state where the coating has been applied to the building board that has been prepared as in FIG. 1 and formed with a bevel on one side.

The coating consists of a second layer 12 of sheet material which covers the top surface 5 and the end face 7, and another layer 13 of sheet material which is applied to the bottom surface 6 of the building board. Thus, a building board is obtained wherein the main surfaces and the end face have the same surface material. Thanks to the first sheet layer 10, the second sheet layer 12 and the smoothening filler layer 11 interposed therebetween, the end face 7 has a surface property that is suitable for applying a high-gloss surface finish. The sheet material of the first sheet layer 10 may be the same as the sheet material for the coating layers 12 and 13. This simplifies the processes of manufacture and storage and saves costs.

Figure 3:
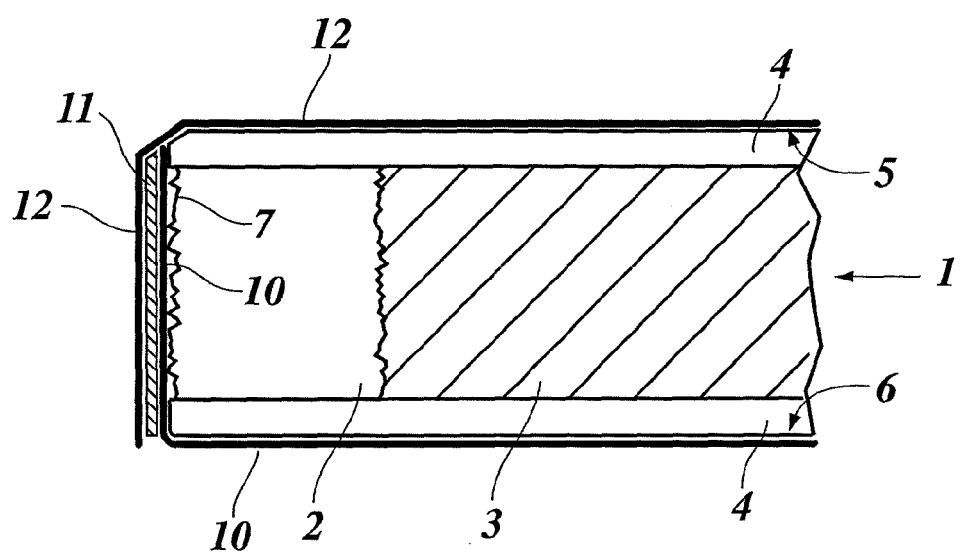
FIG. 3 a second example of a coated building board.

In FIG. 3, another example of a coated building board has been illustrated in cross-section in the same manner as in FIG. 2. Like or equivalent parts are designated by like reference numerals as in the preceding figures. As for the features of the non-coated building board, reference is made to the description of the first embodiment.

In the embodiment shown in FIG. 3, the first sheet layer 10 that is applied to the end face 7 is passed around the lower edge and covers also the bottom surface 6 of the board. Thus, the bottom surface 6 and the end face 7 of the building board can be wrapped in a single process. Then, similarly as in the first embodiment, the layer 11 of filler material is applied to the first sheet layer 10 on the end face 7, as has been described in conjunction with the first embodiment. After an optional step of grinding or polishing of the filler layer 11 and an optional edge bevelling the edge joining the end face 7 to the top surface 5, the second sheet layer 12 is applied to the top surface 5 and again to the end face 7.

It will be understood that the end face of the building board that is opposite to the end face 7 shown in the drawings can be coated in the same manner and with the same steps as described above. Then, each of the first and second sheet layers 10, 12 wraps the building board in a U-configuration, forming single-layer coatings on the top surface 5 and the bottom surface 6 whereas two layers with the filler layer 11 interposed therebetween are provided on the end face 7.

The invention claimed is:

1. A building board with coating, comprising:
   at least one end face,
   two superposed sheet layers of a sheet material covering said end face, and
   a layer of filler material applied between the sheet layers, wherein the layer of filler material is a layer of UV cured lacquer.

2. The building board according to claim 1, wherein the building board includes a top surface and a bottom surface, and at least one of the two sheet layers is passed around an edge of the building board to cover at least one of the top surface and bottom surface of the board.

3. The building board according to claim 2, wherein at least one of the sheet layers is passed around another edge and covers another end face of the board.

4. The building board according to claim 1, wherein the sheet material is one of:
   paper and
   plastic film.

5. A method of coating a building board, comprising the steps of:
   applying a first sheet layer of a sheet material on an end face of the building board,
   applying a layer of a filler material of UV-curing lacquer on the first sheet layer, and
   applying a second sheet layer of a sheet material on the layer of filler material for coating the end face.

6. The method according to claim 5, wherein the layer of filler material is ground before the second sheet layer is applied.

7. The method according to claim 5, wherein at least one of the first and second sheet layers is passed around an edge of the building board to cover at least one of a top surface and a bottom surface of the board.

8. The method according to claim 5, wherein the sheet material is one of:
   paper and
   plastic film.

* * * * *